(12) United States Patent
Chon et al.

(10) Patent No.: US 11,245,346 B2
(45) Date of Patent: Feb. 8, 2022

(54) MULTI-INPUT CHARGING SYSTEM AND METHOD USING MOTOR DRIVING SYSTEM

(71) Applicants: HYUNDAI MOTOR COMPANY, Seoul (KR); KIA MOTORS CORPORATION, Seoul (KR)

(72) Inventors: Chae Duck Chon, Hwaseong-si (KR); Jung Hwi Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 327 days.

(21) Appl. No.: 16/676,357

(22) Filed: Nov. 6, 2019

(65) Prior Publication Data
US 2020/0313581 A1 Oct. 1, 2020

(30) Foreign Application Priority Data
Apr. 1, 2019 (KR) .................. 10-2019-0038035

(51) Int. Cl.
*H02P 5/747* (2006.01)
*H02J 7/00* (2006.01)
*B60L 15/00* (2006.01)
*B60L 50/40* (2019.01)
*B60L 50/61* (2019.01)
*H02M 5/275* (2006.01)
(Continued)

(52) U.S. Cl.
CPC ............ *H02P 5/747* (2013.01); *B60L 15/007* (2013.01); *B60L 50/16* (2019.02); *B60L 50/40* (2019.02); *B60L 50/61* (2019.02); *H02J 7/007* (2013.01); *H02M 5/275* (2013.01); *H02P 2101/45* (2015.01)

(58) Field of Classification Search
CPC .. H02P 5/747; H02P 2101/45; H02P 2209/01; H02J 7/007; Y02E 60/10; Y02T 10/64; Y02T 10/72; Y02T 10/62; Y02T 10/70; Y02T 10/7072; Y02T 10/92; Y02T 90/12; Y02T 90/14; B60L 53/24; B60L 58/12; B60L 53/62; B60L 3/0046; B60L 50/53; B60L 50/60; B60L 2240/54; B60L 15/007; B60L 50/16; B60L 50/40; B60L 50/61; B60L 2240/547; B60L 3/0023; B60L 2210/14; H02M 1/10; H02M 1/36; H02M 3/1584; H02M 7/53871; H02M 1/32; H02M 5/275; H02M 1/322; H02M 3/1552; H01M 10/446; B60Y 2200/91; B60Y 2200/92; B60Y 2300/91; B60Y 2306/15; B60Y 2400/112
USPC ........................................................ 320/117
See application file for complete search history.

(56) References Cited

U.S. PATENT DOCUMENTS

2015/0197156 A1* 7/2015 Song .................. B60L 53/00
320/109
2020/0361323 A1* 11/2020 Chon .................. H02J 7/16

FOREIGN PATENT DOCUMENTS

KR 10-2019-0119778 A 10/2019
KR 10-2020-0068175 A 6/2020
KR 10-2020-0075937 A 6/2020

* cited by examiner

*Primary Examiner* — Paul Dinh
(74) *Attorney, Agent, or Firm* — Morgan, Lewis & Bockius LLP (57) ABSTRACT

A multi-input charging system and method using a motor driving system can prevent relay fusing or cutting in a motor and damage of a neutral point capacitor provided in a
(Continued)

charging power input stage in a process of receiving external charging power through a neutral point of the motor and charging a battery.

18 Claims, 6 Drawing Sheets

(51) Int. Cl.
*B60L 50/16* (2019.01)
*H02P 101/45* (2016.01)

MULTI-INPUT CHARGING SYSTEM AND METHOD USING MOTOR DRIVING SYSTEM

CROSS-REFERENCE TO RELATED APPLICATION

This application claims the benefit of priority to Korean Patent Application No. 10-2019-0038035, filed on Apr. 1, 2019 in the Korean Intellectual Property Office, the entire disclosure of which is incorporated herein by reference.

TECHNICAL FIELD

The present disclosure relates to a multi-input charging system and method using a motor driving system, and more specifically, to a multi-input charging system and method using a motor driving system, which can prevent relay fusing or cutting in a motor and damage of a neutral point capacitor included in a charging power input stage in a process of receiving external charging power through a neutral point of the motor and charging a battery with the charging power.

BACKGROUND

In general, electric vehicles or plug-in hybrid vehicles convert power provided from external charging equipment into a state suitable to charge batteries provided therein and provide the converted power to the batteries to charge the batteries.

For example, conventional charging equipment for rapid charging has been manufactured such that it outputs a single voltage of 400V, but batteries used in vehicles tend to require a voltage of 800V or higher for improvement in efficiency and mileage. Accordingly, a boosting converter for boosting a voltage provided by external charging equipment is required to charge batteries used in vehicles because the batteries have voltage specification of 800V or higher although rapid charging equipment still provides a charging voltage of 400V.

However, a large-capacity boosting converter for boosting 400V to 800V is very heavy and large and is also expensive, and thus the boosting converter is difficult to include in a vehicle and may cause vehicle prices to increase.

Accordingly, a new technique of converting external charging power provided through a neutral point of a motor using an inverter and then providing the converted power to a battery to charge the battery has been proposed as a new charging technique capable of boosting a voltage of charging equipment, which has been constructed as existing infrastructure and provides a relatively low charging voltage, to a high voltage without an additional apparatus and additional cost increase and providing the boosted voltage to a battery in the art. According to this proposed technique, a DC voltage provided by charging equipment can be directly applied to a battery when the DC voltage provided by the charging equipment has a level capable of charging the battery, and the DC voltage of the charging equipment can be boosted using inductance according to coils constituting a motor and switching elements of the inverter and applied to the battery when the DC voltage provided by the charging equipment is lower than a battery voltage.

In this conventional technique, a plurality of relays for determining a path through which charging power is provided according to a voltage level provided by external charging equipment is used and a capacitor for voltage stabilization is additionally applied to a charging power input stage.

Accordingly, to stably apply the conventional technique to charge a battery, various techniques for checking whether the plurality of relays has trouble and preventing the additional capacitor from being damaged during a charging process are required.

The matters disclosed in this section are merely for enhancement of understanding of the general background of the disclosure and should not be taken as an acknowledgment or any form of suggestion that the matters form the related art already known to a person skilled in the art.

SUMMARY

In accordance with the present disclosure, a multi-input charging system using a motor driving system may include: a battery; an inverter for receiving DC power stored in the battery, converting the DC power into three-phase AC power and outputting the three-phase AC power in a motor driving mode; a motor for generating a torque using the three-phase AC power output from the inverter; a main relay having a first terminal connected to the battery and a second terminal connected to the inverter; a first relay having a first terminal connected to the second terminal of the main relay; a neutral point capacitor connected to the second terminal of the first relay; a second relay connected between the neutral point capacitor and a neutral point of the motor; a third relay having a first terminal connected to the neutral point capacitor and a second terminal connected to a charging power input stage to which external charging power is input; and a controller for diagnosing failure of the first relay or the second relay on the basis of a voltage level of the external charging power input to the charging power input stage and then short-circuiting the third relay such that the external charging power is provided to the battery to charge the battery when a charging mode for charging the battery starts in a state in which the motor is not driven.

In an aspect of the present disclosure, the controller may short-circuit the main relay, diagnose failure of the first relay, short-circuit the first relay and then short-circuit the third relay to charge the battery when the charging mode starts and the voltage level of the external charging power is a level capable of charging the battery.

In an aspect of the present disclosure, in order to diagnose failure of the first relay, the controller may provide a control signal for opening the first relay to the first relay, compare voltages of the first and second terminals of the first relay to diagnose failure of the first relay due to fusing, provide a control signal for short-circuiting the first relay to the first relay, and compare the voltages of the first and second terminals of the first relay to diagnose failure of the first relay due to cutting.

In an aspect of the present disclosure, the controller may diagnose failure of the second relay before short-circuiting the third relay.

In an aspect of the present disclosure, in order to diagnose failure of the second relay, the controller may provide a control signal for opening the second relay to the second relay and then compare voltages of the first and second terminals of the second relay to diagnose failure of the second relay due to fusing, or provide a control signal for short-circuiting the second relay to the second relay and then compare the voltages of the first and second terminals of the second relay to diagnose failure of the second relay due to cutting.

In an aspect of the present disclosure, when the charging mode starts and the voltage level of the external charging power is lower than the voltage of the battery, the controller may short-circuit the main relay, diagnose failure of the second relay, short-circuit the second relay, and then short-circuit the third relay such that the external charging power is applied to the neutral point of the motor. The controller may control switching elements included in the inverter to boost the level of the external charging power to a level capable of charging the battery to charge the battery.

In an aspect of the present disclosure, in order to diagnose failure of the second relay, the controller may provide a control signal for opening the second relay to the second relay and then compare voltages of the first and second terminals of the second relay to diagnose failure of the second relay due to fusing, and provide a control signal for short-circuiting the second relay to the second relay and then compare the voltages of the first and second terminals of the second relay to diagnose failure of the second relay due to cutting.

In an aspect of the present disclosure, the controller may diagnose failure of the first relay before short-circuiting the third relay.

In an aspect of the present disclosure, in order to diagnose failure of the first relay, the controller may provide a control signal for opening the first relay to the first relay and then compare voltages of the first and second terminals of the first relay to diagnose failure of the first relay due to fusing, or provide a control signal for short-circuiting the first relay to the first relay and then compare the voltages of the first and second terminals of the first relay to diagnose failure of the first relay due to cutting.

In an aspect of the present disclosure, the controller may charge the neutral point capacitor with a voltage corresponding to the voltage level of the external charging power before short-circuiting the third relay.

In an aspect of the present disclosure, the multi-input charging system may further include: a DC link capacitor connected between the battery and the inverter; and an initial charging circuit for providing power for charging the DC link capacitor before the main relay is short-circuited, wherein the controller short-circuits the first relay before short-circuiting the main relay and simultaneously charges the DC link capacitor and the neutral point capacitor with power supplied from the initial charging circuit when the voltage level of the external charging power is a level capable of charging the battery.

In an aspect of the present disclosure, the controller may charge the neutral point capacitor by short-circuiting the second relay and controlling switching elements in the inverter to apply the voltage of the battery to the neutral point capacitor when the voltage level of the external charging power is lower than the voltage of the battery.

In accordance with another aspect of the present disclosure, a multi-input charging method using the aforementioned multi-input charging system may include: short-circuiting the main relay when the charging mode starts; diagnosing failure of the first relay or the second relay on the basis of a voltage level of the external charging power input to the charging power input stage; and short-circuiting the third relay such that the external charging power is provided to the battery to charge the battery.

In an aspect of the present disclosure, the diagnosing may include diagnosing failure of the first relay and short-circuiting the first relay when the voltage level of the external charging power is a level capable of charging the battery.

In an aspect of the present disclosure, the diagnosing may include diagnosing failure of the second relay before short-circuiting the third relay.

In an aspect of the present disclosure, the diagnosing may include short-circuiting the main relay and then diagnosing failure of the second relay if the voltage level of the external charging power is lower than the voltage of the battery when the charging mode starts.

In an aspect of the present disclosure, the diagnosing may further include diagnosing failure of the first relay before short-circuiting the third relay.

In an aspect of the present disclosure, the multi-input charging method may further include charging the neutral point capacitor with a voltage corresponding to the voltage level of the external charging power before short-circuiting the third relay.

According to various aspects of the multi-input charging system and method using a motor driving system, it is possible to stably charge a battery using charging power with various voltage levels by determining whether relays provided on a path through which the charging power is provided to the battery have failed before power for charging the battery is applied.

In addition, according to various aspects of the multi-input charging system and method using a motor driving system, it is possible to block overcurrent that can be generated at the moment of input of charging power by appropriately pre-charging a charging capacitor provided at an input stage to which charging power is input before the charging power is input, preventing damage of a neutral point capacitor and fusing of a relay.

Effects which may be obtained by the present disclosure are not limited to the aforementioned effects, and other technical effects not described above may be evidently understood by a person having ordinary skill in the art to which the present disclosure pertains from the following description.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, a multi-input charging system and method using a motor driving system according to various exemplary embodiments will be described in more detail with reference to the attached drawings.

Figure 1:
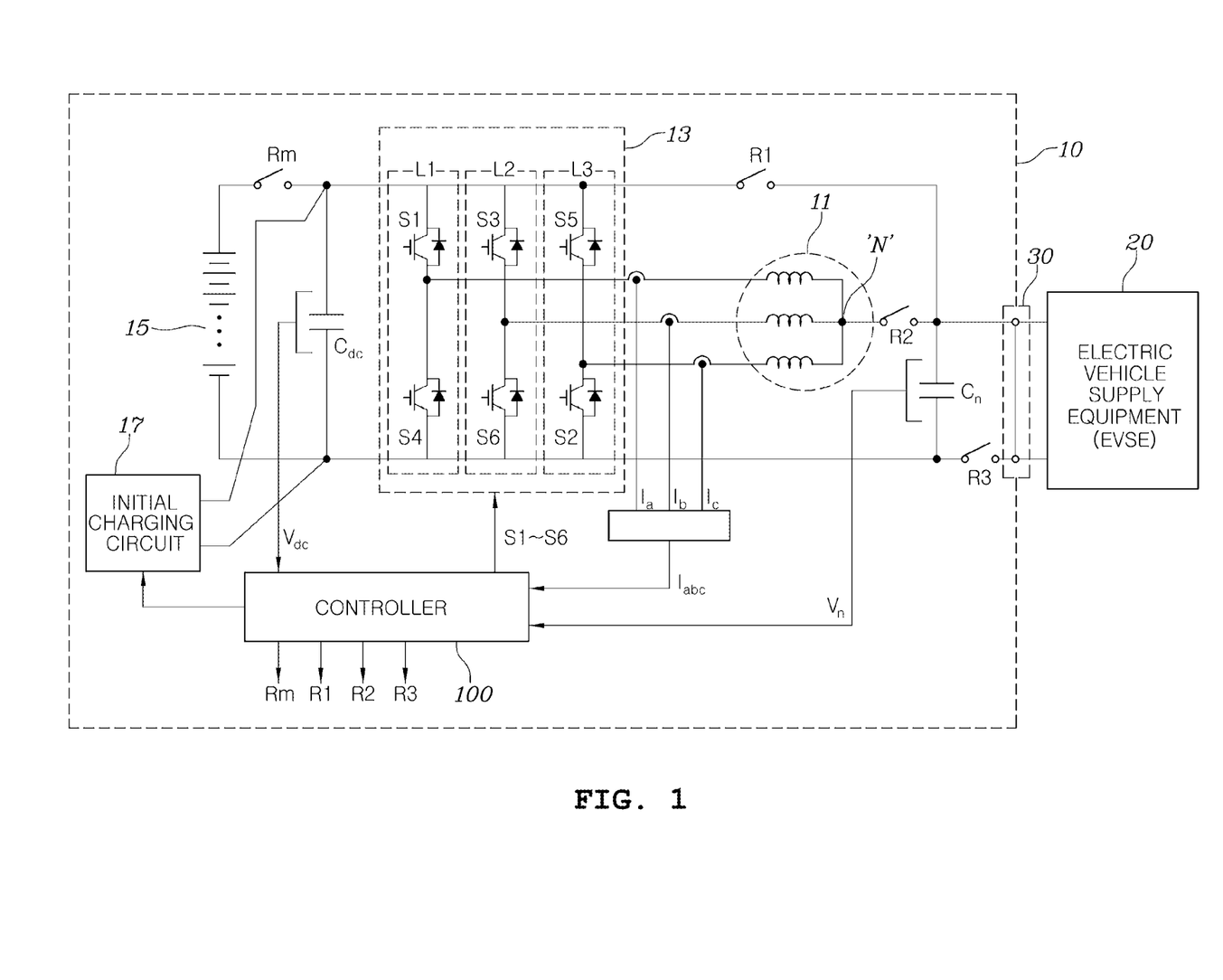
FIG. 1 is a circuit diagram of a multi-input charging system using a motor driving system according to an exemplary embodiment of the present disclosure.

FIG. 1 is a circuit diagram of a multi-input charging system using a motor driving system according to an exemplary embodiment of the present disclosure.

Referring to FIG. 1, a charging system 10 according to an exemplary embodiment of the present disclosure is a system which directly provides charging power supplied from electric vehicle supply equipment (EVSE) 20 to a battery 15 or converts a voltage level of the charging power using an inverter 13 provided to drive a motor 11 and then provides the converted voltage to the battery 15 to charge the battery 15 by appropriately controlling connection states of relays R1 and R2 according to the voltage level of the charging power supplied from the EVSE 20.

In general, a system for driving the motor 11 may include the battery 15 which is an energy storage device for storing power for driving the motor 11, and the inverter 13 which converts DC power stored in the battery 15 into 3-phase AC power and provides the 3-phase AC power to the motor 11. The inverter 13 has three legs connected in parallel with a positive (+) terminal and a negative (−) terminal of the battery 15, two switching elements (two from S1 to S6) are serially connected to each of the legs L1 to L3, and one-phase driving power is provided to the motor 11 from a connection node of two switching elements. In this manner, energy flows from the battery 15 to the motor 11 in FIG. 1 in a motor driving mode for driving the motor 11.

On the other hand, energy flows from the EVSE 20 to the battery 15 in a charging mode for charging the battery 15, differently from the aforementioned energy flow for motor driving. Charging of the battery 15 may be performed in such a manner that the EVSE 20 is directly connected to the battery 15 to provide charging power to the battery 15 or external charging power provided to the neutral point N of the motor 11 is received through a leg corresponding to each phase of the inverter 11 and switching elements of each leg are controlled to boost the charging power and provide the boosted charging power to the battery 15, in response to the voltage level of the charging power provided by the EVSE 20.

Here, a three-phase coil of the motor 11 and switching elements S1 to S6 in the legs L1 to L3 of the inverter 13 connected thereto can constitute a booster circuit in the charging mode in which energy flows from the EVSE 20 to the battery 15. In other words, circuitry equivalent to three booster circuits connected in parallel between the neutral point N of the motor 11 and the battery 15 is formed according to the three-phase motor and the three-phase inverter.

Referring to FIG. 1, the charging system 10 further includes a controller 100. The controller 100 of the charging system 10 according to an exemplary embodiment of the present disclosure may be a processor (e.g., computer, microprocessor, CPU, ASIC, circuitry, logic circuits etc.). The controller 100 may be implemented by a non-transitory memory storing, e.g., a program(s), software instructions reproducing algorithms, etc., which, when executed, controls operations of various components of the charging system 10, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

In the motor driving system according to an exemplary embodiment of the present disclosure, the controller 100 can control connection states of the relays R1 and R2 according to the voltage level of the charging power provided by the EVSE 20.

When the voltage of DC power provided by the EVSE 20 has a level capable of charging the battery, the controller 100 can control the first relay R1 to be short-circuited such that the DC power provided by the EVSE 20 can be directly applied to the battery 15. When the voltage of the DC power provided by the EVSE 20 is lower than the voltage of the battery 15, the controller 100 can control the second relay R2 to be short-circuited, boost the voltage of the DC power of the EVSE 20 through duty control of the switching elements S1 to S6 using inductance according to coils constituting the motor 11 and booster circuits realized by the switching elements S1 to S6 of the inverter 13 and apply the boosted voltage to the battery 15.

Here, the first relay R1 is a relay for determining an electrical connection state between the battery 15 and the charging power input stage 30 for receiving the charging power from the EVSE 20, and the second relay R2 is a relay for determining an electrical connection state between the neutral point N of the motor 11 and the charging power input stage 30.

The multi-input charging system using a motor driving system according to an exemplary embodiment of the present disclosure may further include a main relay Rm and a third relay R3. The main relay Rm is connected between the battery and the inverter 13 and determines an electrical connection relationship between the battery 15 and the inverter 13, and the third relay R3 determines an electrical connection relationship between the charging power input stage 30 and the charging system.

The controller 100 can perform diagnostics control for determining whether the first relay R1 and/or the second relay R2 has failed in an overall charging process as well as determining connection states of the first relay R1 and the second relay R2 according to the voltage supplied from the EVSE 20. Diagnostic control performed by the controller 100 will be more clearly understood through description of charging methods according to various exemplary embodiments of the present disclosure which will be described later.

In addition, the multi-input charging system using a motor driving system according to an exemplary embodiment of the present disclosure may further include a neutral point capacitor Cn connected between a positive (+) terminal and a negative (−) terminal of the charging power input stage 30 for receiving charging power from the EVSE 20, and an initial charging circuit 17 for initially charging a DC capacitor Cdc provided at the input stage of the inverter 13.

In various exemplary embodiments of the present disclosure, the controller 100 can preferentially charge the initial charging circuit 17 or the neutral point capacitor Cn through power conversion before the third relay R3 is short-circuited in order to receive charging power from the EVSE 20.

The operation and effects of the multi-input charging system using a motor driving system having the aforementioned configuration according to various exemplary embodiments of the present disclosure will be understood more clearly through description of multi-input charging methods according to various exemplary embodiments of the present disclosure.

Figure 2:
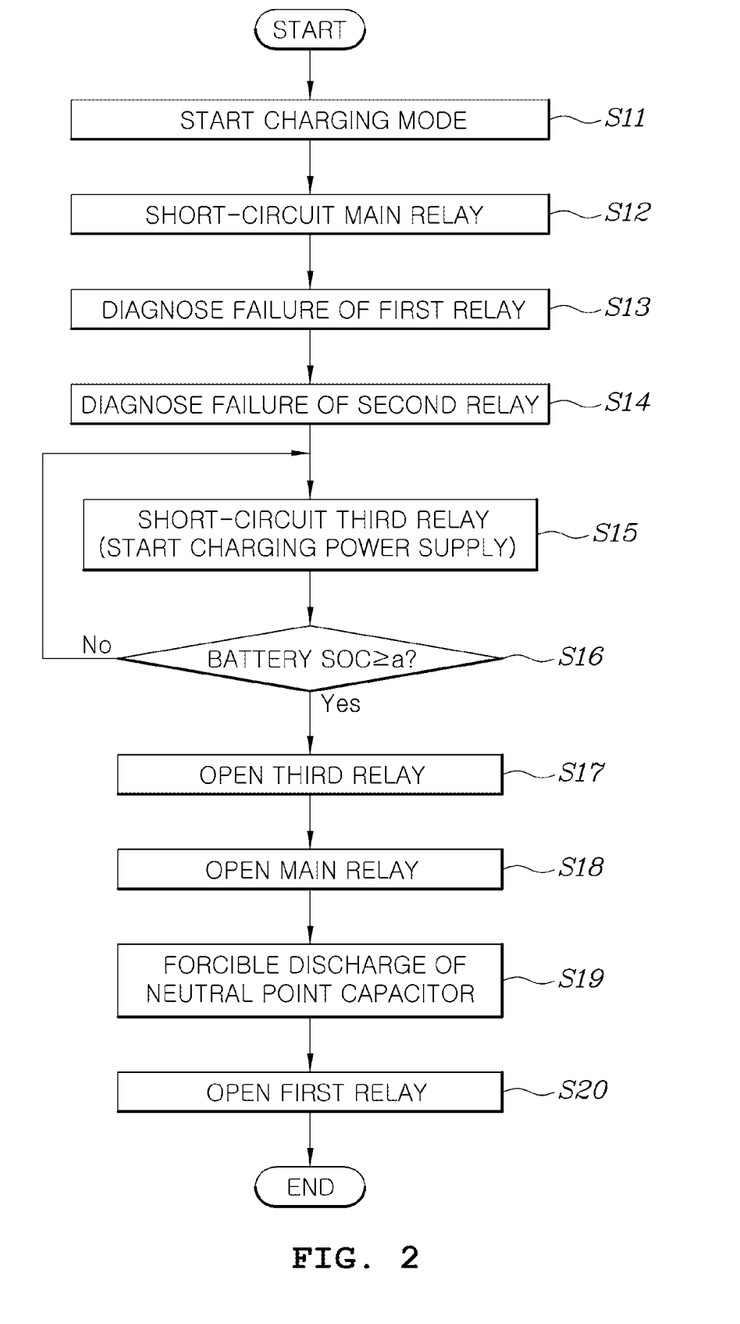
FIG. 2 is a flowchart of a multi-input charging method using a motor driving system according to an exemplary embodiment of the present disclosure.

FIG. 2 is a flowchart of a multi-input charging method using a motor driving system according to an exemplary embodiment of the present disclosure. Particularly, FIG. 2 shows an exemplary embodiment of a case in which the voltage of the charging power supplied from the EVSE 20 has a level capable of charging the battery 15.

First, a charging method according to an exemplary embodiment of the present disclosure applied when the voltage of the charging power supplied from the EVSE 20 has a level capable of charging the battery 15 will be described with reference to FIG. 2.

The multi-input charging method using a motor driving system according to an exemplary embodiment of the present disclosure may start from a step S12 in which the controller 100 short-circuits the main relay Rm when the charging mode starts (S11).

Start of the charging mode may be determined when the controller 100 recognizes connection of a charging connector (not shown) of the EVSE 20 to the charging power input stage 30, receives information (voltage, current specifications, and the like) about charging power from the EVSE 20 and then receives a charging instruction of a driver or a charging instruction according to a preset timer. When the charging mode starts, the controller 100 may short-circuit the main relay Rm by transmitting a control signal for controlling the main relay Rm to be short-circuited to the main relay Rm (S12).

Subsequently, the controller 100 may perform failure diagnosis for the first relay R1 (S13). When the voltage of the charging power supplied from the EVSE 20 has a level capable of charging the battery 15, the first relay R1 is short-circuited such that the DC charging power of the EVSE 20 is directly applied to the battery 15 without passing through other electrical elements to charge the battery 15. That is, when the voltage of the charging power supplied from the EVSE 20 has a level capable of charging the battery 15, connection of the first relay R1 is required and thus failure diagnosis for the first relay R1 is important.

Relay failure diagnosis may be performed in such a manner that the controller 100 provides a control signal for controlling the state of a relay to the relay and then compares voltages of both terminals of the relay.

Figure 3:
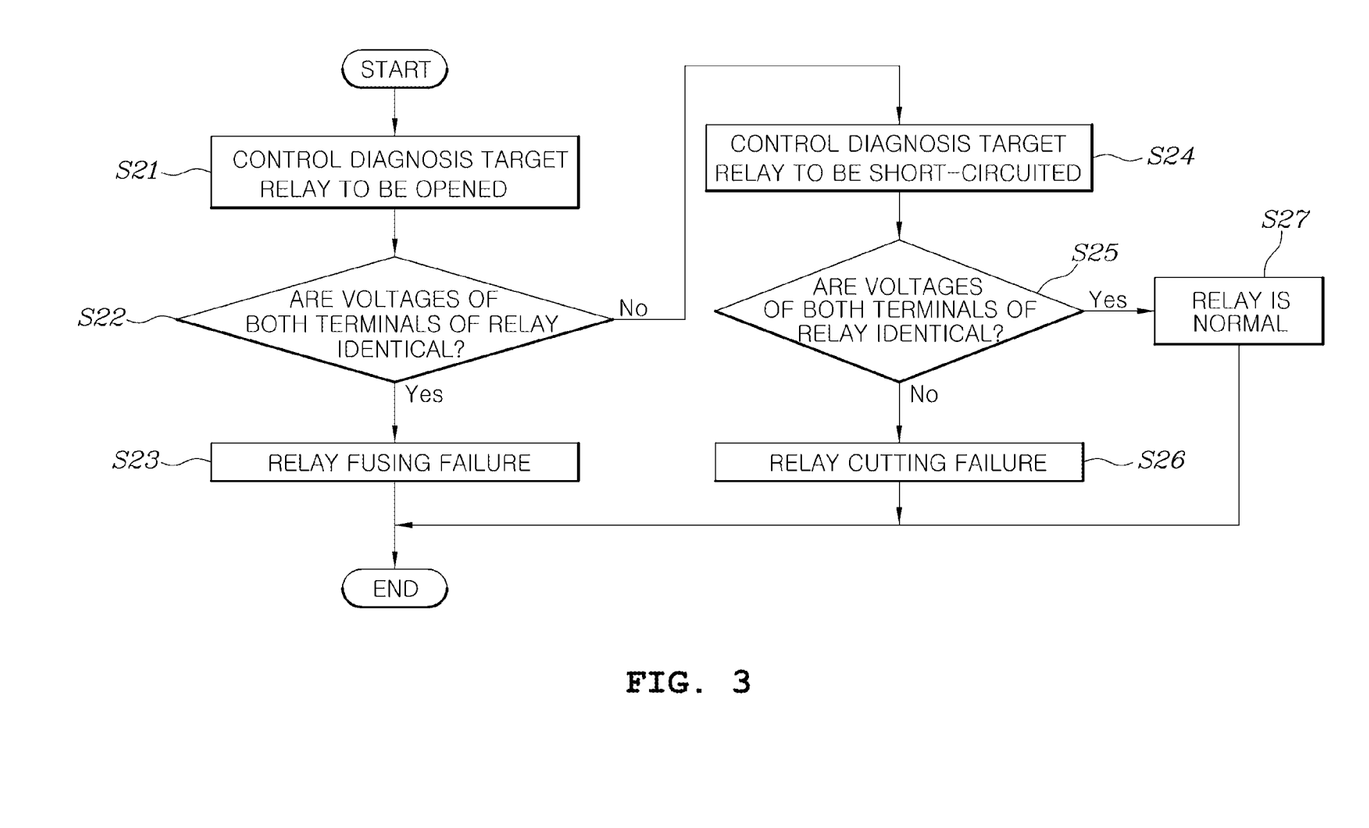
FIG. 3 is a flowchart illustrating a relay failure diagnosis step applied to the multi-input charging method using a motor driving system according to an exemplary embodiment of the present disclosure in more detail.

FIG. 3 is a flowchart illustrating the relay fault diagnosis step applied to the multi-input charting system using a motor driving system according to an exemplary embodiment of the present disclosure in more detail.

Referring to FIG. 3, the controller 100 transmits a control signal for opening a diagnosis target relay (the first relay R1 in step S13) to the diagnosis target relay (S21) and then compares voltages of both terminals of the diagnosis target relay (S22). A voltage sensor (not shown) for detecting a voltage of each terminal may be provided at both terminals of the diagnosis target relay and a voltage detected by the voltage sensor may be transmitted to the controller 100.

When the voltages of both terminals of the diagnosis target relay are identical to each other in step S22, the controller 100 can diagnose the diagnosis target relay as a failed relay that has been fused and thus cannot be opened because the diagnosis target relay is not opened and thus the voltages of both terminals thereof are identical to each other although the signal for opening control has been transmitted.

When the voltages of both terminals of the diagnosis target relay are different from each other in step S22, the controller 100 transmits a control signal for short-circuiting the diagnosis target relay to the diagnosis target relay (S24) and compares voltages of both terminals of the diagnosis target relay (S25).

When the voltages of both terminals of the diagnosis target relay are different from each other in step S25, the controller 100 can diagnose the diagnosis target relay as a failed relay that has been cut and thus cannot be short-circuited because the diagnosis target relay is not short-circuited opened and thus the voltages of both terminals thereof are different from each other although the signal for short-circuit control has been transmitted.

When the voltages of both terminals of the diagnosis target relay are identical to each other in step S25, the controller 100 can determine that the diagnosis target relay is normal. In a modified example, the order of control for diagnosing fusing failure and control for diagnosing cutting failure may be changed.

Upon determining that the first relay R1 is normal after failure diagnosis of the first relay R1 in step S13, the first relay R1 may be controlled to be short-circuited such that the charging power can be supplied to the battery 15 through the first relay R1 later. Upon determining that the first relay R1 has failed in step S13, the controller 100 may warn of occurrence of failure through a vehicle cluster and end the charging mode.

Subsequently, it is optionally determined whether the second relay R2 has failed (S14). Although the second relay R2 is not used when the voltage of the charging power supplied from the EVSE 20 has a level capable of charging the battery 15, the charging power input stage 30 and the neutral point of the motor 11 are short-circuited if charging is performed with the second relay R2 welded to cause ripples to be input to the motor 11 and the inverter 13, adversely affecting the same. Accordingly, it is possible to optionally determine whether the second relay R2 has failed in order to use the second relay R2 for charging or maintenance later.

Failure diagnosis for the second relay R2 (S14) may be performed in the same manner as that described with reference to FIG. 3, and both diagnosis of fusing and diagnosis of cutting may be performed or only one thereof may be optionally performed.

Thereafter, the controller 100 may short-circuit the third relay R3 such that the charging power supplied from the EVSE 20 is provided to the charging system to charge the battery 15 (S15).

The controller 100 may monitor a state of charge (SOC) of the battery 15 while the charging power is applied (S16) and open the third relay R3 when the SOC of the battery 100 has reached a predetermined charge target value a to stop supply of the charging power (S17).

Subsequently, the controller 100 may open the main relay Rm and forcibly discharge the neutral capacitor Cn (S19). Forcible discharge of the neutral capacitor Cn may be performed in such a manner that the controller 100 short-circuits two switching elements included in one of the legs of the inverter.

When forcible discharge of the neutral capacitor Cn is completed, the controller 100 may open the first relay R1 to end the charging mode (S20).

Further, in the multi-input charging method according to an exemplary embodiment of the present disclosure, initial charging control may be performed such that the neutral point capacitor Cn can be charged with a voltage at an appropriate level in order to prevent damage of the neutral point capacitor Cu and fusing of the third relay R3 due to overcurrent inflow caused by application of a high voltage from the EVSE 20 to the neutral point capacitor Cn according to relay connection.

In charging performed in the embodiment illustrated in FIG. 2, a voltage corresponding to the voltage of the battery 15 is also applied to the neutral point capacitor Cn through the first relay R1, and thus the neutral point capacitor Cn can also be charged using the existing initial charging circuit 17 in order to initially charge the DC capacitor Cdc for generating a DC voltage at the terminals of the inverter 13 on the side of the battery 15. Here, the initial charging circuit 17 is a circuit operating to provide an appropriate voltage and current to the DC capacitor Cdc in order to charge the DC capacitor Cdc before the main relay Rm is short-circuited.

Since the initial charging circuit 17 is a circuit for preventing the DC capacitor Cdc from being damaged due to abrupt current inflow when the main relay Rm switches from an open state to a short-circuit state, the first relay R1 can be short-circuited before the main relay Rm is short-circuited such that the DC capacitor Cdc and the neutral point capacitor Cn can be charged together.

Figure 4:
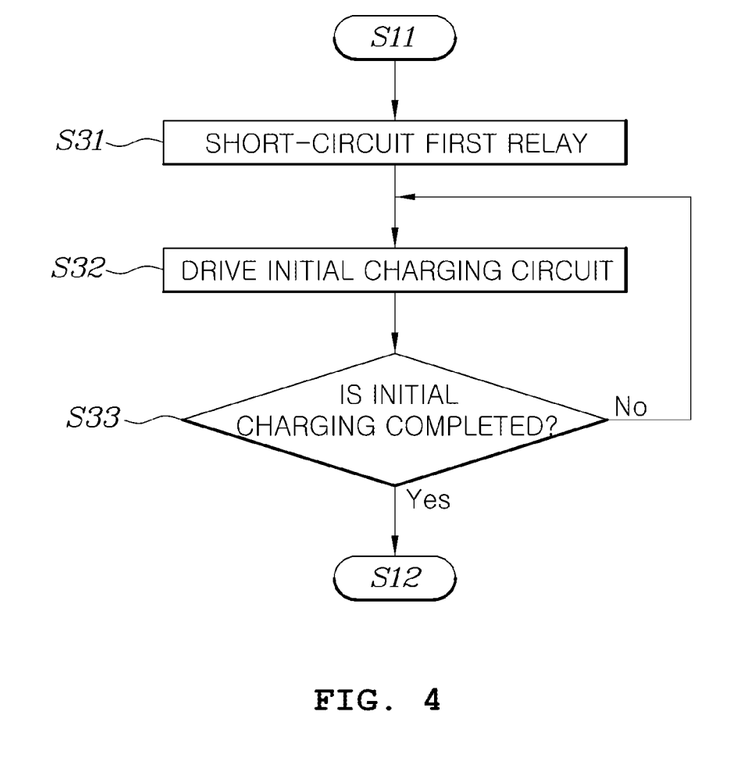
FIG. 4 is a flowchart illustrating an initial neutral point capacitor charging technique applied to the embodiment shown in FIG. 2.

FIG. 4 is a flowchart illustrating an initial neutral point capacitor charging technique applied to the embodiment shown in FIG. 2.

Referring to FIG. 4, the controller 100 may short-circuit the first relay R1 first (S31) and then drive the initial charging circuit 17 to charge the DC capacitor Cdc and the neutral point capacitor Cn (S32) after the charging mode starts (S11). When the DC capacitor Cdc and the neutral point capacitor Cn are charged with a predetermined voltage through voltage sensors (not shown) provided in the DC capacitor Cdc and the neutral point capacitor Cn and thus initial charging is completed (S33), the process can proceed to the subsequent step S12.

As described above, according to an exemplary embodiment of the present disclosure, it is possible to block overcurrent that may be generated at the moment of input of charging power to prevent damage of the neutral point capacitor Cn and fusing of the third relay R3 by charging the neutral point capacitor Cn provided at a position at which the charging power is input with a predetermined voltage.

Next, a charging method when the voltage of the charging power provided by the EVSE 20 has a level lower than the voltage of the battery 15 will be described.

Figure 5:
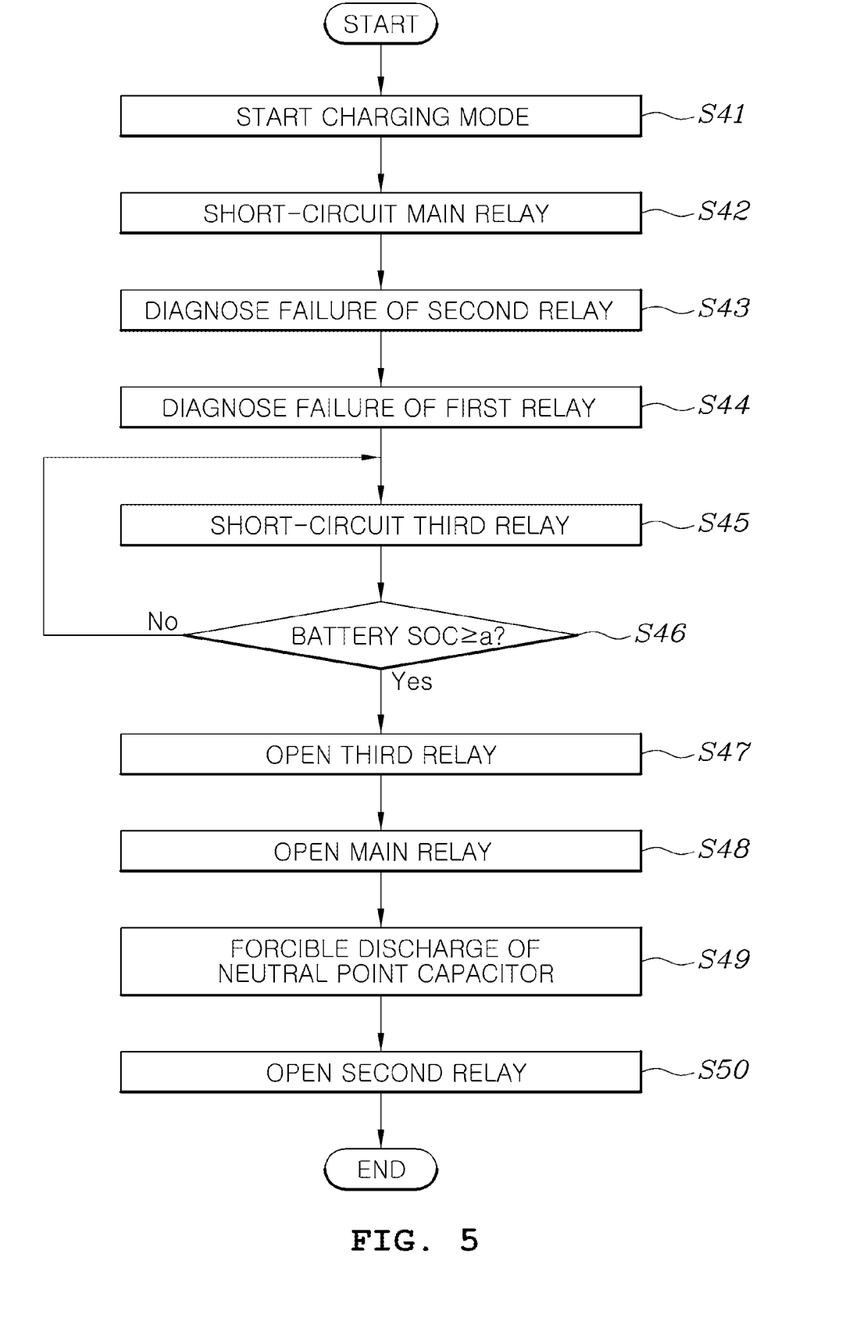
FIG. 5 is a flowchart of a multi-input charging method using a motor driving system according to another exemplary embodiment of the present disclosure.

FIG. 5 is a flowchart of a multi-input charging method using a motor driving system according to another exemplary embodiment of the present disclosure and shows an embodiment of a charging method when the voltage of the charging power is lower than the voltage of the battery 15.

Referring to FIG. 5, the multi-input charging method using a motor driving system according to an exemplary embodiment of the present disclosure may start from a step S42 in which the controller 100 short-circuits the main relay Rm when the charging mode starts (S41). Steps S41 and S42 are substantially the same as steps S11 and S12 described in FIG. 2 and thus additional description is omitted.

Subsequently, the controller 100 may perform failure diagnosis for the second relay R2 (S43). When the voltage of the charging power supplied from the EVSE 20 is lower than the voltage of the battery 15, the second relay R2 is short-circuited such that the DC charging power of the EVSE 20 is applied to the neutral point N of the motor 11 and the voltage of the neutral point N is boosted through control of the switching elements of the inverter 13 and provided to the battery 15, charging the battery 15. That is, when the voltage of the charging power supplied from the EVSE 20 is lower than the voltage of the battery 15, it is important to perform failure diagnosis for the second relay R2 because connection of the second relay R2 is required.

Failure diagnosis for the second relay R2 can be understood through the above description with reference to FIG. 3 and thus additional description is omitted.

Upon determining that the second relay R2 is normal from failure diagnosis for the second relay R2 in step S43, the second relay R2 can be controlled to be short-circuited such that the charging power can be supplied to the battery 15 through the second relay R2. Upon determining that the second relay R2 has failed in step S43, the controller 100 may warn of occurrence of failure through a vehicle cluster or the like and end the charging mode.

Subsequently, it is possible to optionally determine whether the first relay R1 has failed (S44). Although the first relay R1 is not used when the voltage of the charging power supplied from the EVSE 20 is lower than the voltage of the battery 15, it is possible to optionally diagnose failure of the first relay R1 in order to determine whether the first relay R1 has failed in advance to use the first relay R1 for charging or maintenance later.

Failure diagnosis for the second relay R2 (S44) may be performed in the same manner as that described with reference to FIG. 3, and both diagnosis of fusing and diagnosis of cutting may be performed or only one thereof may be optionally performed.

Thereafter, the controller 100 may short-circuit the third relay R3 such that the charging power supplied from the EVSE 20 is provided to the charging system to charge the battery 15 (S45).

In this step S45, the controller 100 may control pulse width modulation of the switching elements S1 to S6 of the inverter 13 in order to receive three-phase currents Ia, Ib and Ic of the motor 11, the voltage Vn of the neutral point capacitor Cn and the voltage Vdc of the DC capacitor Cdc and provide a voltage and current with desired levels to the battery 15. Various voltage control and current control methods performed through the controller 100 are disclosed in KR 10-2018-0043152 A, KR 10-2018-0154797 A and KR 10-2018-0160200 A applied by the Applicant and methods of controlling switching elements in boost converter topology for boosting are known in the art, and thus additional description of a control method for boosting the charging power and providing the same to the battery 15 is omitted.

The controller 100 may monitor a state of charge (SOC) of the battery 15 while the charging power is applied (S46) and open the third relay R3 when the SOC of the battery 100 has reached a predetermined charge target value a to stop supply of the charging power (S47).

Subsequently, the controller 100 may open the main relay Rm and forcibly discharge the neutral capacitor Cn (S49). The controller 100 may perform forcible discharge of the neutral capacitor Cn by short-circuiting switching elements S2, S4 and S6 at the lower parts among the switching elements included in the legs of the inverter, or may short-circuit both the two switching elements included in each leg to cause forcible discharge of both the neutral capacitor Cn and the DC capacitor Cdc.

When forcible discharge of the neutral capacitor Cn is completed, the controller 100 may open the second relay R2 to end the charging mode (S50).

Further, in the case of charging control when the voltage of the charging power supplied from the EVSE 20 is lower than the voltage of the battery 15, it is also necessary to perform initial charging control such that the neutral point capacitor Cn is pre-charged with a voltage at an appropriate level in order to prevent damage of the neutral point capacitor Cu and fusing of the third relay R3 due to overcurrent inflow caused by application of a high voltage from the EVSE 20 to the neutral point capacitor Cn according to relay connection.

In charging control when the voltage of the charging power supplied from the EVSE 20 is lower than the voltage of the battery 15, it is possible to perform initial charging by providing the power of the battery 15 to the neutral point capacitor Cn using a voltage drop control of the inverter 13 before short-circuiting of the third relay R3 rather than using the initial charging circuit 17 that performs initial charging on the basis of the voltage of the battery 15.

Figure 6:
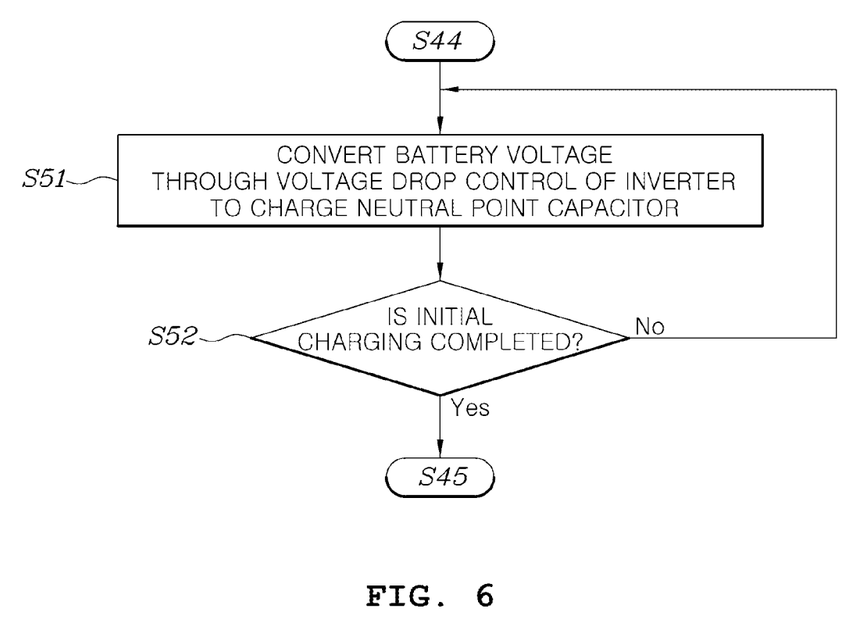
FIG. 6 is a flowchart illustrating an initial neutral point capacitor charging technique applied to the embodiment shown in FIG. 5.

FIG. 6 is a flowchart illustrating an initial neutral point capacitor charging technique applied to the embodiment shown in FIG. 5.

Referring to FIG. 6, after failure diagnosis of the first relay of FIG. 5 is performed (S44), the controller 100 may control the switching elements included in at least one leg of the inverter 13 such that the voltage of the battery 15 is dropped and provided to the neutral point capacitor Cn. The switching elements included in one leg of the inverter 13 and inductance generated by the coils of the motor 11 can constitute a buck converter when power flow from the battery 15 to the neutral point N occurs. Using this, the controller 100 may control switching elements such that a buck converter composed of the switching elements included in at least one leg of the inverter 13 and the coils of the motor 11 can provide an appropriate initial charging voltage and current to the neutral point capacitor Cn (S51).

When charging of the neutral point capacitor Cn with a desired voltage through the voltage drop control of the inverter 13 is completed (S52), the controller 100 can short-circuit the third relay R3 such that the charging power supplied from the EVSE 20 is applied to the charging system.

As described above, the multi-input charging systems and methods using a motor driving system according to various exemplary embodiments of the present disclosure can stably charge a battery using charging power with various voltages by determining whether relays provided on a path through which the charging power is provided to the battery have failed before power for charging the battery is applied.

In addition, the multi-input charging systems and methods using a motor driving system according to various exemplary embodiments of the present disclosure can block overcurrent that can be generated at the moment of input of charging power by appropriately pre-charging a charging capacitor provided at an input terminal to which charging power is input before the charging power is input, preventing damage of a neutral point capacitor and fusing of a relay.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A multi-input charging system using a motor driving system, comprising:
   a battery;
   an inverter for receiving DC power stored in the battery, converting the DC power into three-phase AC power, and outputting the three-phase AC power in a motor driving mode;
   a motor for generating a torque using the three-phase AC power output from the inverter;
   a main relay having a first terminal connected to the battery and a second terminal connected to the inverter;
   a first relay having a first terminal connected to the second terminal of the main relay;
   a neutral point capacitor connected to the second terminal of the first relay;
   a second relay connected between the neutral point capacitor and a neutral point of the motor;
   a third relay having a first terminal connected to the neutral point capacitor and a second terminal connected to a charging power input stage to which external charging power is input; and
   a controller for diagnosing failure of the first relay or the second relay on the basis of a voltage level of the external charging power input to the charging power input stage and then short-circuiting the third relay such that the external charging power is provided to the battery to charge the battery when a charging mode for charging the battery starts in a state in which the motor is not driven.

2. The multi-input charging system according to claim 1, wherein the controller short-circuits the main relay, diagnoses failure of the first relay, short-circuits the first relay, and then short-circuits the third relay to charge the battery when the charging mode starts and the voltage level of the external charging power is a level capable of charging the battery.

3. The multi-input charging system according to claim 2, wherein, in order to diagnose failure of the first relay, the controller provides a control signal for opening the first relay to the first relay, compares voltages of the first and second terminals of the first relay to diagnose failure of the first relay due to fusing, provides a control signal for short-circuiting the first relay to the first relay, and compares the voltages of the first and second terminals of the first relay to diagnose failure of the first relay due to cutting.

4. The multi-input charging system according to claim 2, wherein the controller diagnoses failure of the second relay before short-circuiting the third relay.

5. The multi-input charging system according to claim 4, wherein, in order to diagnose failure of the second relay, the controller provides a control signal for opening the second relay to the second relay and then compares voltages of the first and second terminals of the second relay to diagnose failure of the second relay due to fusing, or provides a control signal for short-circuiting the second relay to the second relay and then compares the voltages of the first and second terminals of the second relay to diagnose failure of the second relay due to cutting.

6. The multi-input charging system according to claim 1, wherein, when the charging mode starts and the voltage level of the external charging power is lower than the voltage of the battery, the controller short-circuits the main relay, diagnoses failure of the second relay, short-circuits the second relay, and then short-circuits the third relay such that the external charging power is applied to the neutral point of the motor, and
   the controller controls switching elements included in the inverter to boost the level of the external charging power to a level capable of charging the battery to charge the battery.

7. The multi-input charging system according to claim 6, wherein, in order to diagnose failure of the second relay, the controller provides a control signal for opening the second relay to the second relay and then compares voltages of the first and second terminals of the second relay to diagnose failure of the second relay due to fusing, and provides a control signal for short-circuiting the second relay to the second relay and then compares the voltages of the first and second terminals of the second relay to diagnose failure of the second relay due to cutting.

8. The multi-input charging system according to claim 6, wherein the controller diagnoses failure of the first relay before short-circuiting the third relay.

9. The multi-input charging system according to claim 8, wherein, in order to diagnose failure of the first relay, the controller provides a control signal for opening the first relay to the first relay and then compares voltages of the first and second terminals of the first relay to diagnose failure of the first relay due to fusing, or provides a control signal for short-circuiting the first relay to the first relay and then compares the voltages of the first and second terminals of the first relay to diagnose failure of the first relay due to cutting.

10. The multi-input charging system according to claim 1, wherein the controller charges the neutral point capacitor with a voltage corresponding to the voltage level of the external charging power before short-circuiting the third relay.

11. The multi-input charging system according to claim 10, further comprising:
- a DC link capacitor connected between the battery and the inverter; and
- an initial charging circuit for providing power for charging the DC link capacitor before the main relay is short-circuited,
- wherein the controller short-circuits the first relay before short-circuiting the main relay and simultaneously charges the DC link capacitor and the neutral point capacitor with power supplied from the initial charging circuit when the voltage level of the external charging power is a level capable of charging the battery.

12. The multi-input charging system according to claim 10, wherein the controller charges the neutral point capacitor by short-circuiting the second relay and controlling switching elements in the inverter to apply the voltage of the battery to the neutral point capacitor when the voltage level of the external charging power is lower than the voltage of the battery.

13. A multi-input charging method using the multi-input charging system of claim 1, comprising:
short-circuiting the main relay when the charging mode starts;
diagnosing failure of the first relay or the second relay on the basis of a voltage level of the external charging power input to the charging power input stage; and
short-circuiting the third relay such that the external charging power is provided to the battery to charge the battery.

14. The multi-input charging method according to claim 13, wherein the diagnosing comprises diagnosing failure of the first relay and short-circuiting the first relay when the voltage level of the external charging power is a level capable of charging the battery.

15. The multi-input charging method according to claim 14, wherein the diagnosing comprises diagnosing failure of the second relay before short-circuiting the third relay.

16. The multi-input charging method according to claim 13, wherein the diagnosing comprises short-circuiting the main relay and then diagnosing failure of the second relay when the charging mode starts and the voltage level of the external charging power is lower than the voltage of the battery.

17. The multi-input charging method according to claim 16, wherein the diagnosing further comprises diagnosing failure of the first relay before short-circuiting the third relay.

18. The multi-input charging method according to claim 13, further comprising charging the neutral point capacitor with a voltage corresponding to the voltage level of the external charging power before short-circuiting the third relay.

* * * * *